US008170380B1

(12) United States Patent
Gilra

(10) Patent No.: US 8,170,380 B1
(45) Date of Patent: May 1, 2012

(54) METHOD AND APPARATUS FOR IMPORTING, EXPORTING AND DETERMINING AN INITIAL STATE FOR FILES HAVING MULTIPLE LAYERS

(75) Inventor: Anant Gilra, Karnatak (IN)

(73) Assignee: Adobe Systems Incorporated, San Jose, CA (US)

( * ) Notice: Subject to any disclaimer, the term of this patent is extended or adjusted under 35 U.S.C. 154(b) by 1006 days.

(21) Appl. No.: 12/130,412

(22) Filed: May 30, 2008

(51) Int. Cl.
*G06K 9/03* (2006.01)
(52) U.S. Cl. .......................................... 382/309; 345/619
(58) Field of Classification Search .......... 382/309–311; 345/650–689, 20–29
See application file for complete search history.

(56) References Cited

U.S. PATENT DOCUMENTS

| | | | | |
|---|---|---|---|---|
| 5,581,796 A * | 12/1996 | Koga et al. | .................... | 345/623 |
| 5,734,761 A * | 3/1998 | Bagley | .......................... | 382/309 |
| 5,926,186 A * | 7/1999 | Itoh et al. | ...................... | 345/619 |
| 6,065,011 A * | 5/2000 | Bulusu et al. | ......................... | 1/1 |
| 6,307,563 B2 * | 10/2001 | Kimura | ......................... | 345/474 |
| 6,903,751 B2 * | 6/2005 | Saund et al. | ...................... | 345/619 |
| 7,468,731 B2 * | 12/2008 | Eldridge et al. | ............. | 345/581 |
| 2001/0030653 A1 * | 10/2001 | Bossut et al. | ................. | 345/619 |
| 2004/0085293 A1 * | 5/2004 | Soper et al. | .................... | 345/156 |
| 2005/0157932 A1 * | 7/2005 | Yamasaki | ..................... | 382/199 |
| 2006/0267950 A1 * | 11/2006 | Fux et al. | ...................... | 345/169 |

\* cited by examiner

*Primary Examiner* — Jingge Wu
(74) *Attorney, Agent, or Firm* — Kilpatrick Townsend and Stockton LLP

(57) ABSTRACT

A method, apparatus and computer program product for importing, exporting and determining an initial state for files having multiple layers is presented. A file having a plurality of layers is imported, the file in a first format and wherein each layer of the plurality of layers includes a first state of the layer and a second state of the layer. One of the first state of the layer and the second state of the layer are displayed for each of the plurality of layers. A swapping is permitted between the first state of the layer and the second state of the layer. One of the first state of the layer and the second state of the layer are then committed. The file may be exported in a format different than the first format.

26 Claims, 7 Drawing Sheets

METHOD AND APPARATUS FOR IMPORTING, EXPORTING AND DETERMINING AN INITIAL STATE FOR FILES HAVING MULTIPLE LAYERS

BACKGROUND

The following terminology will be used throughout to describe and refer to various items used in importing, exporting and determining an initial state for files having multiple layers. A layer (sometimes referred to as an object) is a component of an image file. An image file can have several (up to hundreds) layers. There may be different types of layers in an image file (for example a content layer, a shape layer, a web layer, etc.). A layer set is a group that can contain multiple layers (objects). Bi-state refers to a layer including two states, typically a maintain appearance state and an editable state.

There are different types of editing applications used for editing image files. A typical image file can contain several layers, each layer having a maintain appearance state and an editable state.

When a user imports/opens an application's native file format into another application, a mapping is created between the features supported if the user wants the features imported to be editable. When this conversion of formats in done during import, it is possible that the user gets either an exact match, an approximate match or no match at all.

An example of an approximate match can occur when a first application might support different parameters for an effect as compared to a second application, and might use a different algorithm for implementing the same effect, thus the appearance of an effect in the first application would be different from the appearance of the same effect in the second application, if the user elects to import in editable mode. However, when the user imports in maintain appearance mode, the appearance would be the same. An example of a no match at all scenario occurs when a feature of a first application is not supported in the second application.

Ideally, a user would want to have full editability with exact appearance match. Many times the user ends up in either an approximate match situation or a situation where there is no match at all. Almost all applications that include an import feature have options for importing the entire file as a flattened bitmap wherein layers are lost (this would not be used if the user wants to make changes to the file, as this is least flexible). The import feature may also include an option wherein the appearance of layers is maintained, and editability of layers in a file is maintained. The import feature may also include an option wherein the editability of the file is maintained (i.e. import as vector with editable text, layer effects and complex masks even if it means losing the appearance, either partially or fully).

However, a user can only either import all the layers as maintain appearance state or all of layers as editable state. A typical designer works with hundreds of layers, and it is a problem for the designer to either import all the layers as maintain appearance (raster) or import all the layers as editable. One workaround is that designers import with both options and copy paste the best from each layer, which is time consuming and cumbersome. For example, an image file may have 200 layers and the user wants 70 layers to be completely editable and the remaining 130 layers as maintain appearance state.

When a user exports a file, if the user exports files in maintain appearance mode, the appearance is maintained for all the layers, which is good, but vectors, text, attributes of layer effects etc. cannot be edited. This can be a severe limitation. If a user exports files in editable mode, all hundreds of layers become editable, but many of them appear different, due to which the entire resultant appearance is different. To get around this, the user can export the file with layers (generally in order of hundreds) in both modes separately, and mix and combine the layers between them using copy and paste functions. Again this is cumbersome and time consuming.

SUMMARY

Conventional mechanisms such as those explained above suffer from a variety of deficiencies. One such deficiency is that if the user imports and/or exports such files in editable mode, all hundreds of layers become editable, but many of them appear different, due to which the entire resultant appearance is different, (e.g., just one clipping path mask layer, not mapped exactly, can compromise the entire appearance of the file). Users can't swap states, instead they have to import files in both modes, and copy paste some layers, and delete the duplicates.

In the editable scenario, it is very difficult for users to determine which layer(s) have compromised the appearance and feel of the image. When there is an approximate match or no match, the appearance is different from the original file. However, in some cases, the appearance is greatly different (clipping path masks) and in some percentage of cases it is slightly different (for example, some effect like glow or drop shadow did not map exactly).

If the user finds the appearance of the file has been compromised, the user can import twice, once in maintain appearance mode and once in editable mode. The user can then copy the layers that change the appearance significantly from maintain appearance states to editable states. However, finding the layers that compromise the appearance from hundreds of them can be a time-consuming task, especially with those layers tend to be hierarchical in nature.

A methodology referred to herein as Smart Interactive Import is presented wherein for each layer, the flexibility of viewing a maintain appearance counterpart of a layer and an editable counterpart of a layer are provided, and a swapping between the two counterparts can be accomplished. This is useful in scenarios where a user doesn't like the appearance of the editable layer (appearance needn't be preserved in editable case), and would be able to determine which preference the user wants to utilize only after viewing both the editable state and the maintain appearance state. The active states can be committed once the user is satisfied with the appearance. The same methodology can be used on layer sets, smart objects, nested symbols, masks etc.

In another embodiment referred to herein as Smart Export, for each layer, the two states of the layer (the editable state and the maintain appearance state) are stored separately as two different layers with the same layer identifier, but one of the states is inactive, having a tag denoting the state type. For each layer, the flexibility of viewing the maintain appearance counterpart and the editable counterpart are provided to a user, as well as the ability to swap between the two.

In a further embodiment, a methodology is provided wherein a similarity percentage is specified for layers, and on an import or export operation the file is provided in a mixture of maintain appearance and editable states in accordance with the similarity percentage.

Still other embodiments include a computerized device, configured to process all the method operations disclosed herein. In such embodiments, the computerized device includes a memory system, a processor, communications interface in an interconnection mechanism connecting these components. The memory system is encoded with a process that provides for importing, exporting and determining an initial state for files having multiple layers as explained herein that when performed (e.g. when executing) on the processor, operates as explained herein within the computerized device to perform all of the method embodiments and operations explained herein. Thus any computerized device that performs or is programmed to perform processing explained herein is an embodiment of the disclosure.

Other arrangements of embodiments of the disclosure that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing importing, exporting and determining an initial state for files having multiple layers as explained herein. The computer program logic, when executed on at least one processor with a computing system, causes the processor to perform the operations (e.g., the methods) indicated herein as embodiments of the disclosure. Such arrangements of the disclosure are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the disclosure. Software processes that operate in a collection of computerized devices, such as in a group of data communications devices or other entities can also provide the system of the disclosure. The system of the disclosure can be distributed between many software processes on several data communications devices, or all processes could run on a small set of dedicated computers, or on one computer alone.

It is to be understood that the embodiments of the disclosure can be embodied strictly as a software program, as software and hardware, or as hardware and/or circuitry alone, such as within a data communications device. The features of the disclosure, as explained herein, may be employed in data communications devices and/or software systems for such devices such as those manufactured by Adobe Systems Incorporated of San Jose, Calif.

Note that each of the different features, techniques, configurations, etc. discussed in this disclosure can be executed independently or in combination. Accordingly, the present disclosure can be embodied and viewed in many different ways. Also, note that this summary section herein does not specify every embodiment and/or incrementally novel aspect of the present disclosure or claimed disclosure. Instead, this summary only provides a preliminary discussion of different embodiments and corresponding points of novelty over conventional techniques. For additional details, elements, and/or possible perspectives (permutations) of the disclosure, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the disclosure, as illustrated in the accompanying drawings in which like reference characters refer to the same parts throughout the different views.

The drawings are not necessarily to scale, emphasis instead being placed upon illustrating the principles of the disclosure.

DETAILED DESCRIPTION

In conventional image editing applications, there exists no convenient way of selecting, at a layer level, one of editable appearance and maintain appearance states of a layer of a file having multiple layers. Described herein is a methodology for importing a file having multiple layers (referred to as Smart Interactive Import) wherein the layers are represented in a state selected by the user. The user can chose to have all the layers initially rendered in either a maintain appearance state or in an editable state or in a combination of the two states. The user can easily swap between the two states for a layer by clicking on a thumbnail for the layer. The user can also export the file wherein each layer is exported having both states included, referred to herein as Smart Export.

An editing application generally provides an interface that has Application Programming Interfaces (APIs) that are used for importing and/or exporting that application's file format. An object can be converted to raster and also mapped to one of the native objects such that it becomes editable based on the preference selected.

Every special kind of bi/dual state object has a pointer to another object. If the object is in maintain appearance state (initial state), the pointer it contains points to the editable counterpart object that is created following the existing mapping norms. Only the active state of the object is rendered.

Based on a Graphical User Interface (GUI) input, a swapping from one state to the other state of the layer is provided. When any discarding mechanisms (commit layer, commit file) are triggered, the state not being edited or displayed is deleted, to save memory.

Both the maintain appearance state and the editable state are initially retrieved, but one of the states is hidden from the user. The initial state that is visible is obtained and presented based on which of the two states has been selected. For any layer, a swapping between the states can be accomplished using a GUI gesture. For any layer, the user can commit the preferred state in one layer and discard the other layer state using a commit GUI gesture.

Figure 1:
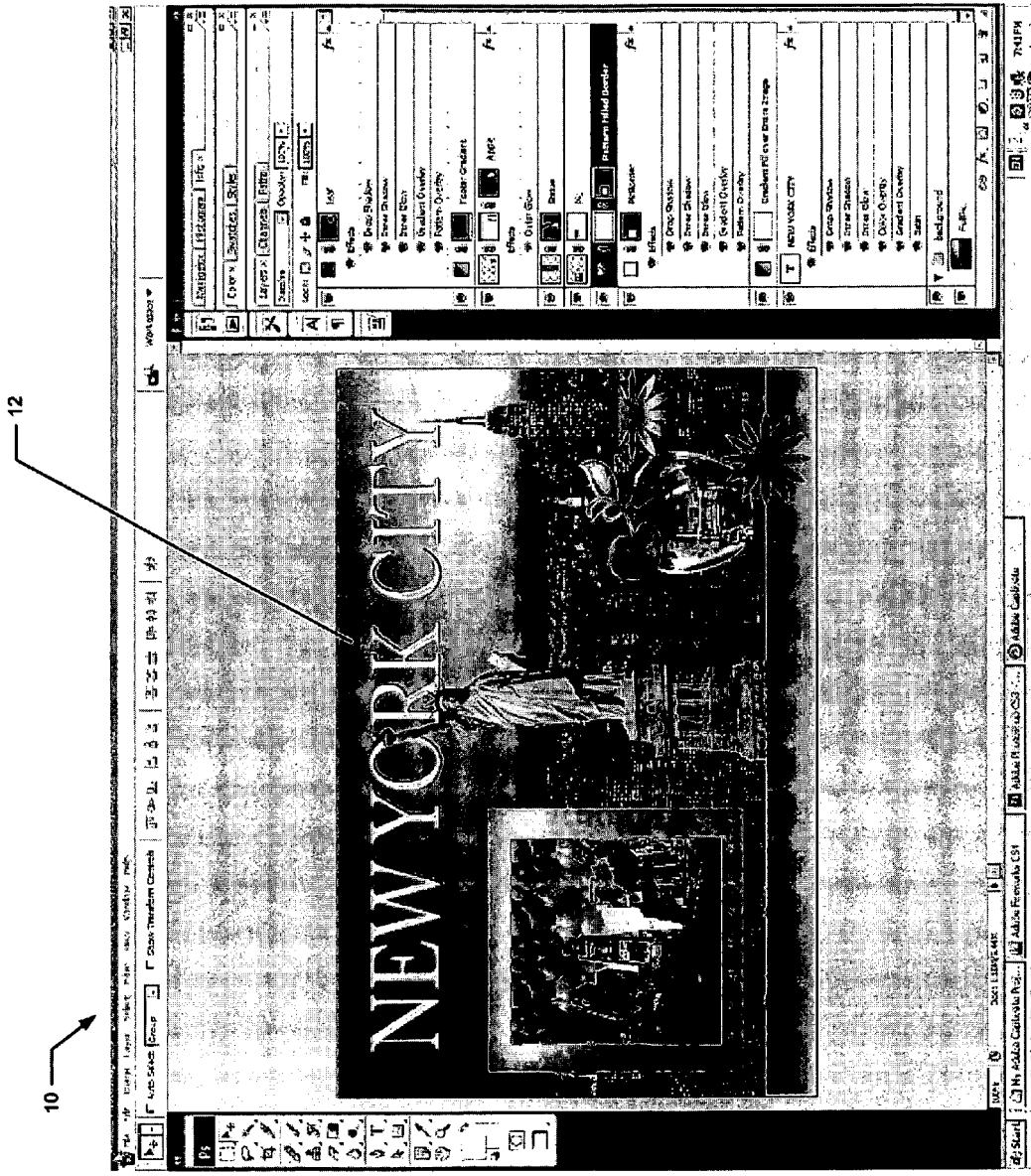
FIG. 1 depicts a screen shot of an image opened in an application using a native format.

Referring now to FIG. 1, a screen shot of a GUI 10 is shown. An image 12 is shown having been selected by the user, and is displayed by an application wherein the format of the image is native to the application. The application however may not provide all the editing features a user requires to make the desired changes to the image and hence the user may be required to import the image into another application. In this example, the image has eleven layers.

Figure 2:
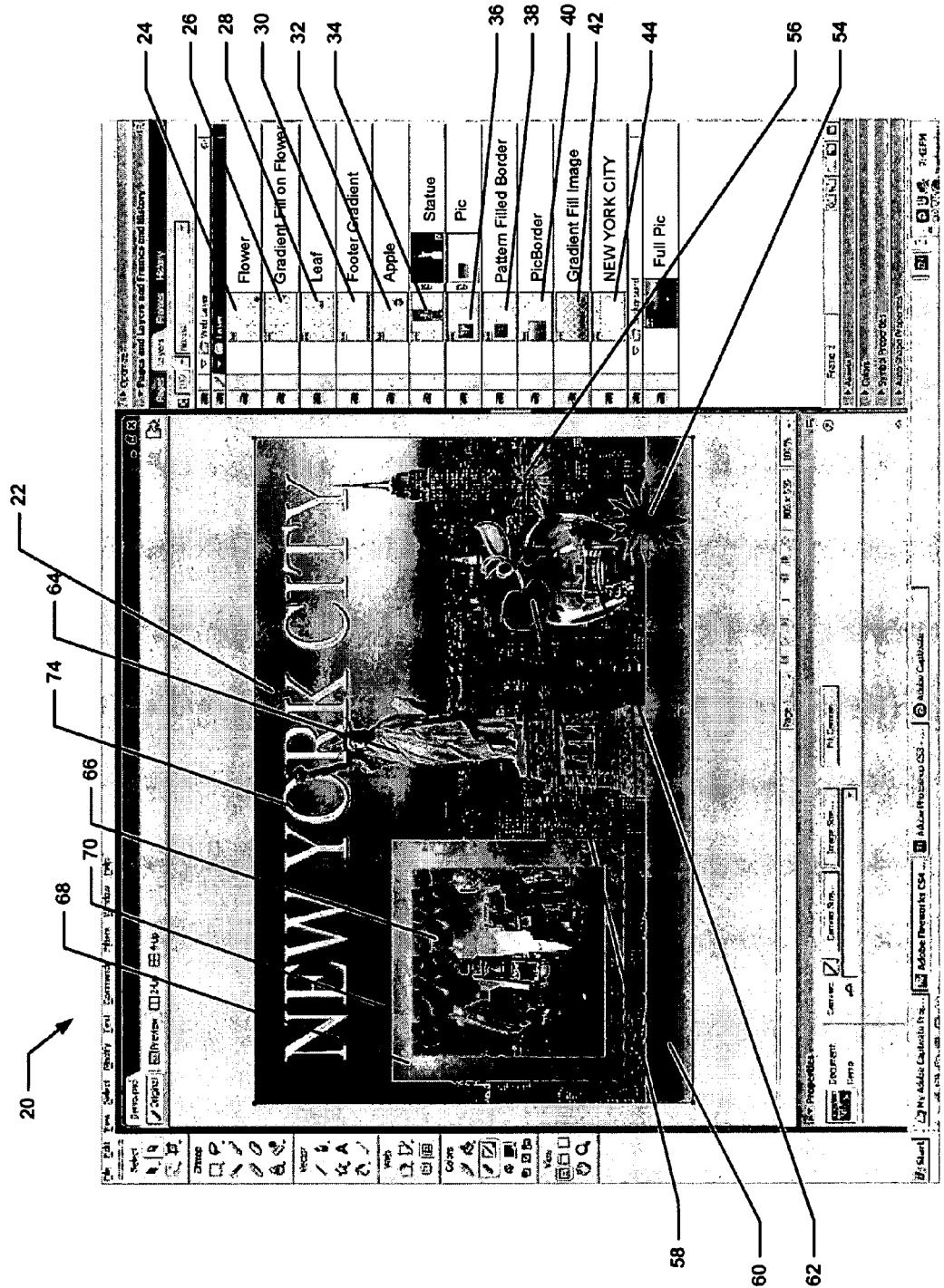
FIG. 2 depicts a screen shot of the same image shown in FIG. 1, imported in maintain appearance mode in accordance with embodiments of the disclosure.

Referring now to FIG. 2, a screen shot 20 of a GUI is shown. In this example, the same image is being shown, however the image has been imported into a different application and is being edited in accordance with the Smart Interactive Import methodology. The user has selected to view the layers in a first state, in this example the maintain appearance state. The image 22 closely resembles the image 12 for FIG. 1, with only some very slight differences between the images 12 and 22. Also shown are thumbnails for each layer. Thumbnail 24 is for the flower layer and represents the solid flower 54. Thumbnail 26 is for the gradient fill flower and represents the gradient flower 56. Thumbnail 28 is for the leaf layer and represents the leaf 58. Thumbnail 30 is for the footer gradient and represents the footer 60 of the image. Thumbnail 32 is for the apple layer and represents the apple 62. Thumbnail 34 is for the statue layer and represents the statue of liberty 64. Thumbnail 36 is for the pic layer and represents the picture 66. Thumbnail 38 is for the pattern filled border layer and represents the pattern fill 68 around picture 66. Thumbnail 40 is for the picborder layer 40 and represents the picture border 70. Thumbnail 42 is for the gradient fill over entire image layer. Thumbnail 44 is for the New York City layer and represents the New York City term 74.

Any one of the layer thumbnails can be selected, and the layer represented by the thumbnail is changed from the maintain appearance state to the editable state. Thus, in this example, if the user desired to edit the leaf layer using a tool not supported by the maintain image format, the user could click on thumbnail 28 and the displayed leaf layer would change from the maintain appearance state of the leaf layer to the editable state of the leaf layer. The user could then make the desired changes to the leaf layer. Upon finishing the edits to the leaf layer, the user could commit the layer or commit the entire file.

Figure 3:
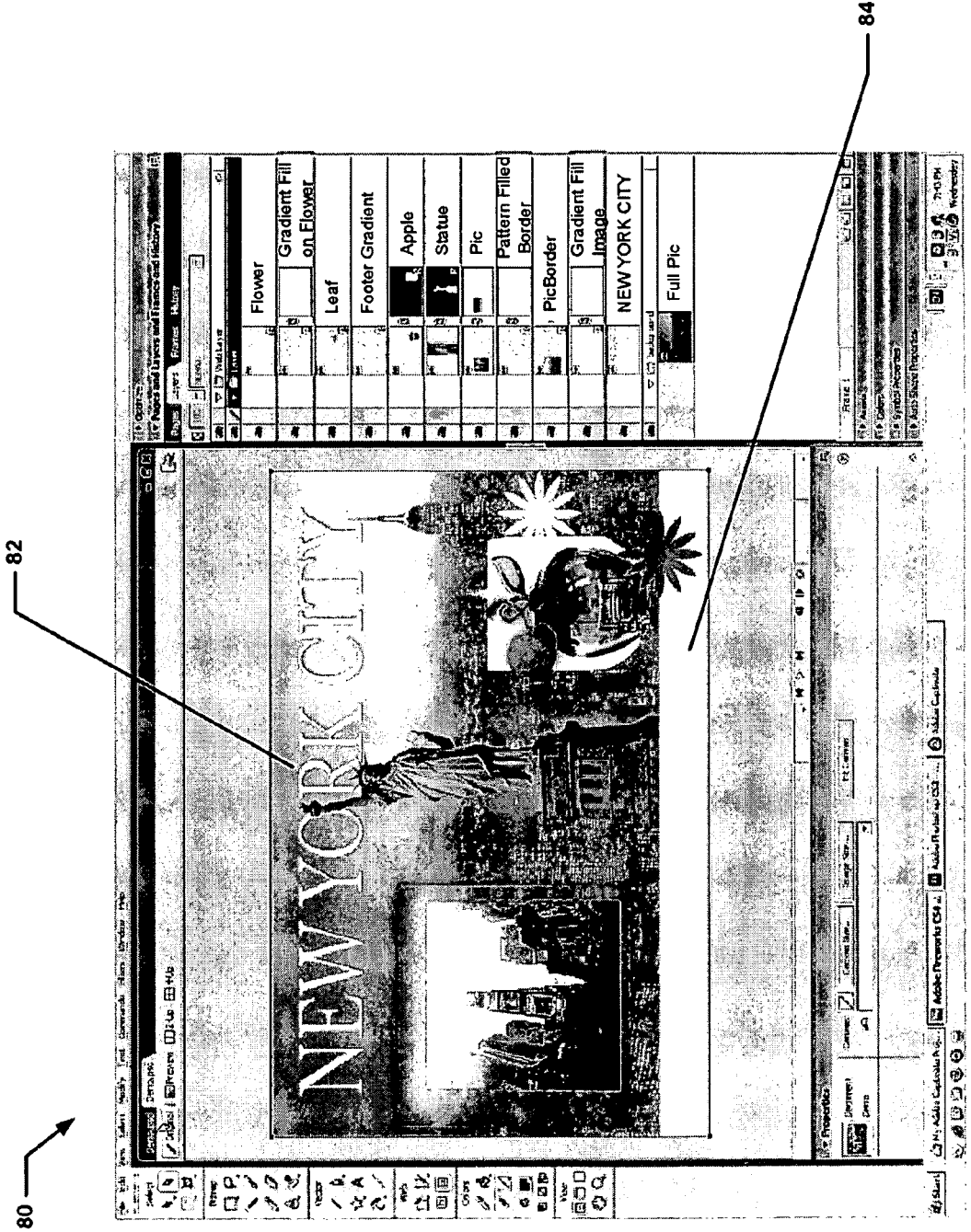
FIG. 3 depicts a screen shot of the same image shown in FIG. 1, imported in editable mode in accordance with embodiments of the disclosure.

Referring now to FIG. 3, a screen shot 80 of a GUI is shown. In this example, the same image is being shown, however the user has selected to view the layers in a first state, in this example the editable state. The image 82 has several differences as compared to the image 12 of FIG. 1 and image 22 of FIG. 2. Also shown are thumbnails for each layer, similar to FIG. 2.

Any one of the layer thumbnails can be clicked, and the layer represented by the thumbnail is swapped from the editable state to the maintain appearance state. Thus, in this example if the user was unhappy with the footer gradient layer 84 currently displayed in an editable state, since the footer gradient layer is quite different from the footer gradient layer in the maintain appearance state, the user could click on the footer gradient thumbnail 30 and the footer gradient layer 84 would be swapped from the editable state to the maintain appearance state and the footer gradient would appear like the footer gradient shown in image 22 instead of the footer gradient shown in image 82. The user could commit the layer or commit the entire file.

The GUI gestures used to perform the swapping between states and the committing of a layer could be realized by any type of GUI item including, but not limited to the following.

The GUI gesture could be realized as a click or double click on a thumbnail. The thumbnail could have a thumbnail so that one can distinguish between the two states, e.g.: a first style thumbnail for the maintain appearance state and no thumbnail in the editable state. The thumbnail could have another thumbnail to show that the bi-state is active, and either no thumbnail or a disabled thumbnail to show that the bi-state is inactive. These thumbnails can be displayed in any of the corners of the layer thumbnail.

The GUI gesture could also be realized as a click on some thumbnail (similar to the eye/lock thumbnail) on the layer panel to change state. This thumbnail would represent at least two states—maintain appearance and editable and optionally two more states to that one of the states has been frozen, and the other is lost.

The GUI gesture could also require selection from menu items or context menu items applied on selection (i.e., multiple layers at the same time). In this case, the user would swap to the other state. The GUI gesture could further include the use of short cut keys, or the double clicking on the element/object on the canvas to get the other counterpart.

The same process can be applied on an entire group/layer set instead of an individual layer, and all layers in the layer set could be obtained in maintain appearance state, and on a swap operation on that layer group thumbnail, the maintain appearance state for the layer set is swapped to the editable state for the layer set.

The active state of the two states for each layer is committed on closing the file and the inactive state is lost, since it is not stored in the file format. However, in other embodiments, both states may be stored in the file format, or committed on save or other operations.

In some embodiments, editing of each of these states may not be allowed. In some embodiments, the layer names for both states could be different. In some embodiments, this idea could be applied to convert other kinds of objects to raster and vice versa. These other objects could include smart objects, symbols, groups or masks (clicking on mask thumbnail will make it change from editable mask and maintain appearance mask).

Another methodology is known as Smart Export. In the Smart Export methodology, a file is opened, the file having a plurality of layers. The file is in a first format. A layer is selected from the plurality of layers. A first state for the layer and a second state for the layer are provided, and the user can select which state to display. By way of the GUI, the user can swap between the first state of the layer and the second state of the layer. The user can then export the file wherein for at least one layer of the file, the first state of the layer and the second state of the layer are stored separately as two different layers having a same layer identifier (id) and wherein one of the states is inactive. In Smart Export, saving into another file format can be thought of as saving the initial format for the initial active state, and saving the other state with the same layer identifier, but with a new tag, which specifies the second inactive state name. Other applications could thus ignore the second inactive state, but the export format owner application could understand the inactive state. The Smart Export methodology is different from the way the saving would be done in Smart Interactive Import, since Smart Interactive Import stores a reference to the other state in the element itself, while in Smart Export there are two different elements, with one element having an extra custom tag.

In some scenarios, it may be desirable to provide a mixture of layer states in a file. For such a scenario, both states are imported for each layer. Both states of the layer are then flattened (e.g.; converted to bitmap) and are then compared to each other. The comparison could be made using an exclusive or (XOR) function. A similarity value is calculated, for example the similarity value is equal to the summation over all pixels ((grey value at a pixel)/255)/Total number of pixels. A similarity percentage can be determined after XORing each pixel of both states (e.g., percentage similarity=100*(1−similarity)). This value is compared to a threshold that is configurable. For example, if a user decides on a 90% similarly level, the layers that fulfill this threshold are kept as editable layers and the remaining layers that do not meet the threshold are kept as maintain appearance layers. The result of this operation is the user obtains a file that is at least 90% similar automatically on an import or save operation.

After determining the similarity percentages as described above, the percentages could be shown as overlays on the thumbnails or at some other place in different color shades. (A darker color means that layer needs attention and is closer to the threshold.) Different colors could be used for layers that are less than the threshold as compared to those which are greater than the threshold and the color shade would be determined based on the proximity to the threshold. The layer sets (groups) could show the overall average of the similarity percentages of the layers of the set.

Figure 4:
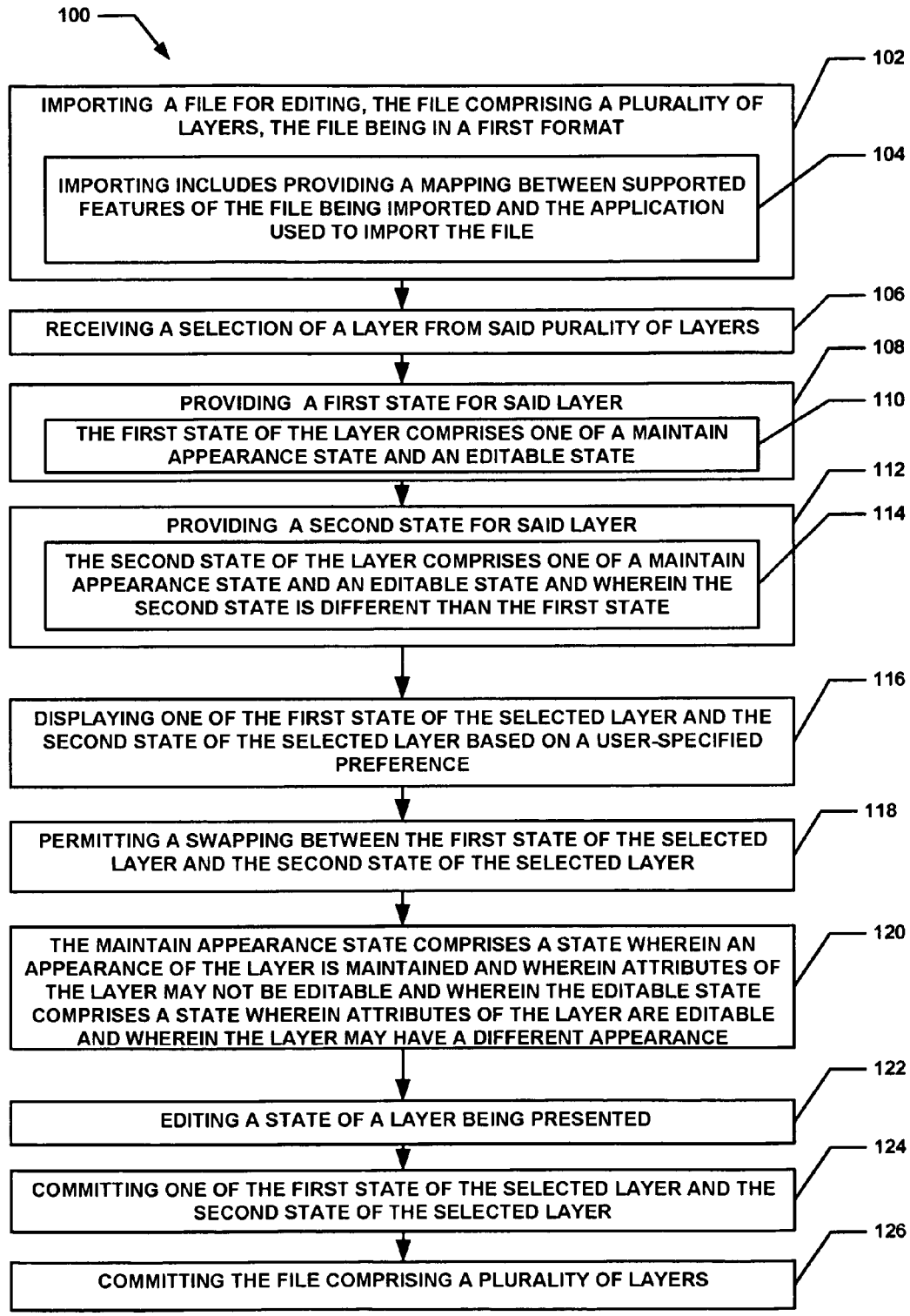
FIG. 4 depicts a flow diagram of a particular embodiment of a method of importing a file having multiple layers.
Figure 5:
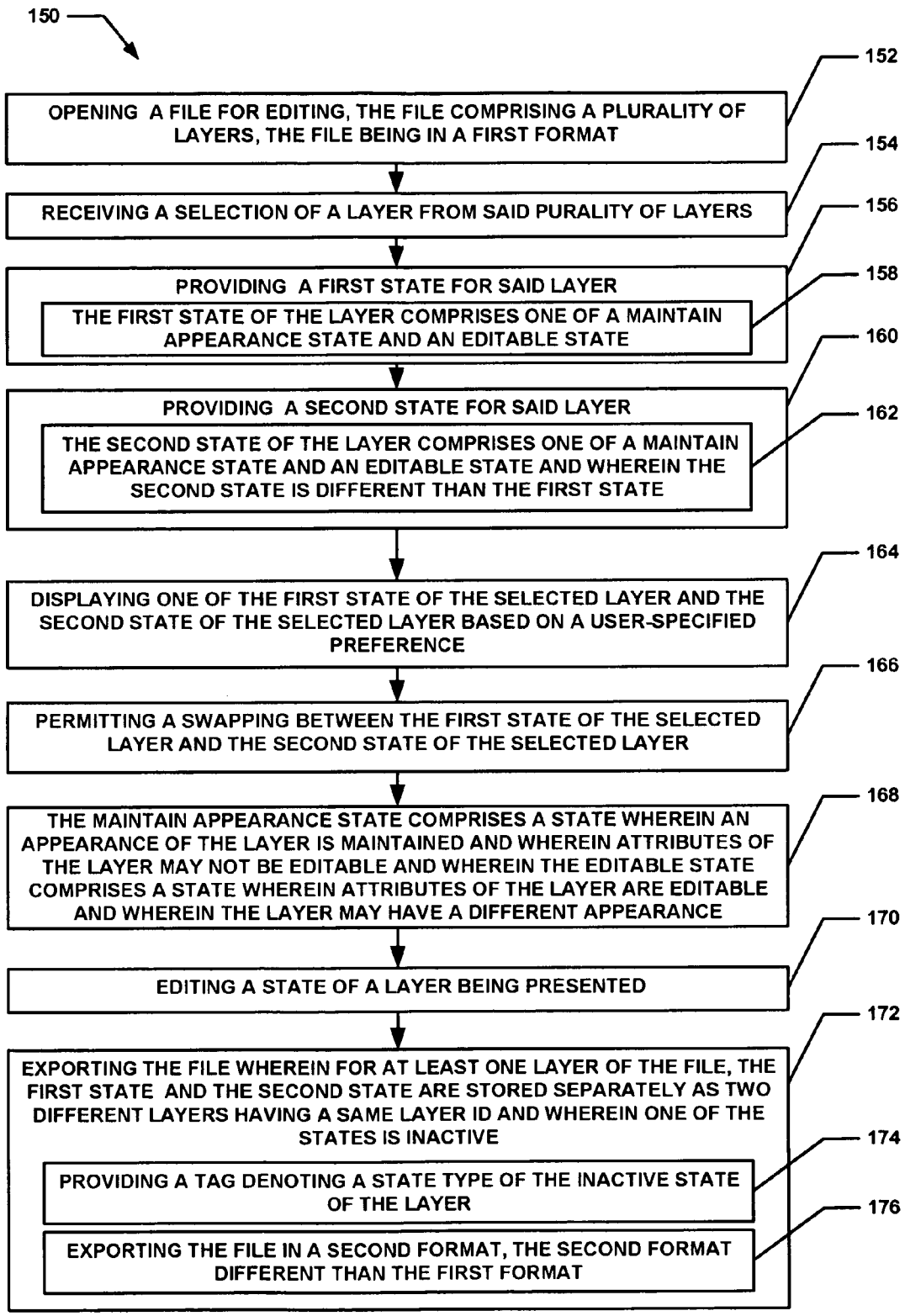
FIG. 5 depicts a flow diagram of a particular embodiment of a method of exporting a file having multiple layers.
Figure 6:
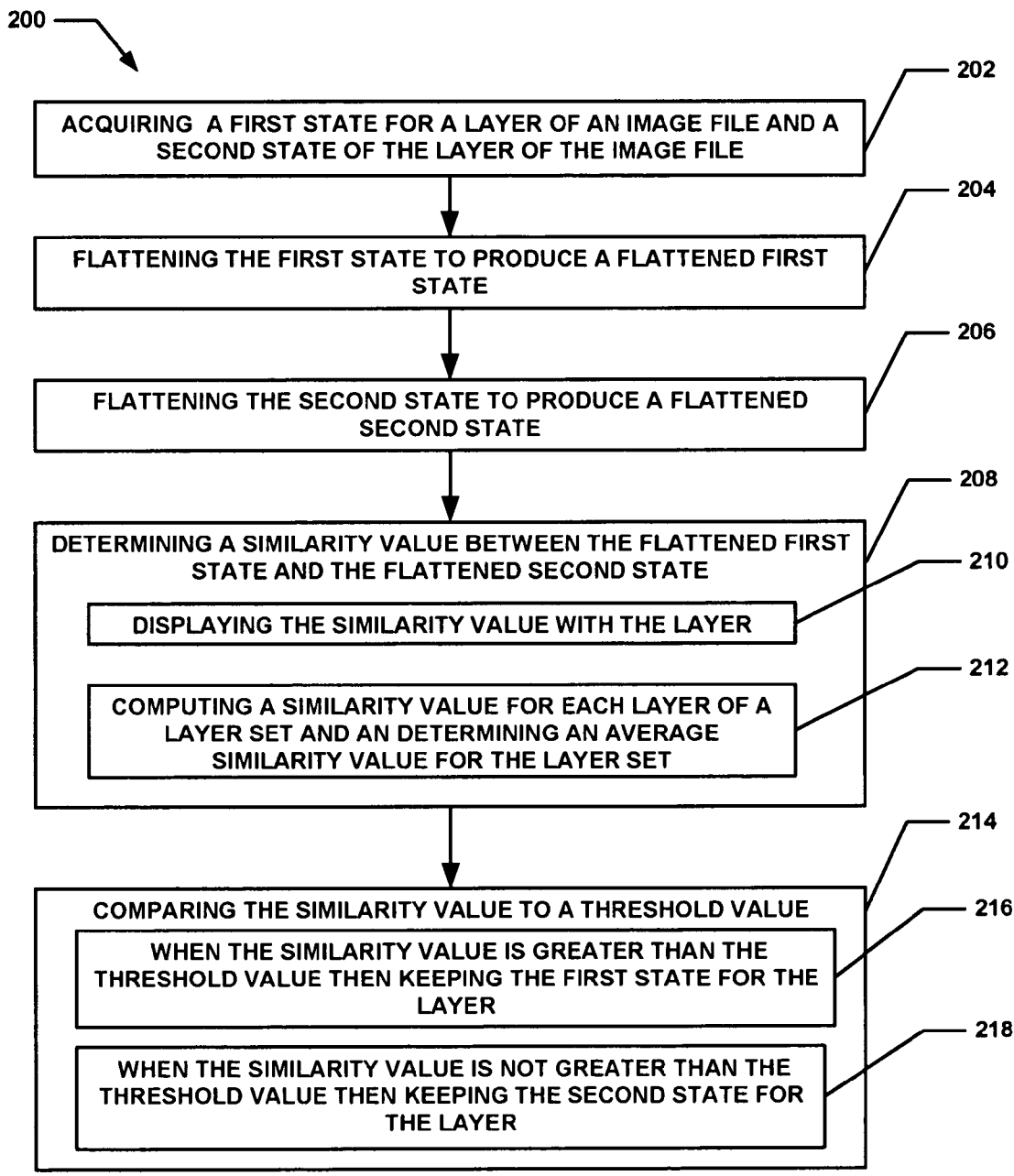
FIG. 6 depicts a flow diagram of a particular embodiment of a method of determining an initial state for files having multiple layers.
Figure 7:
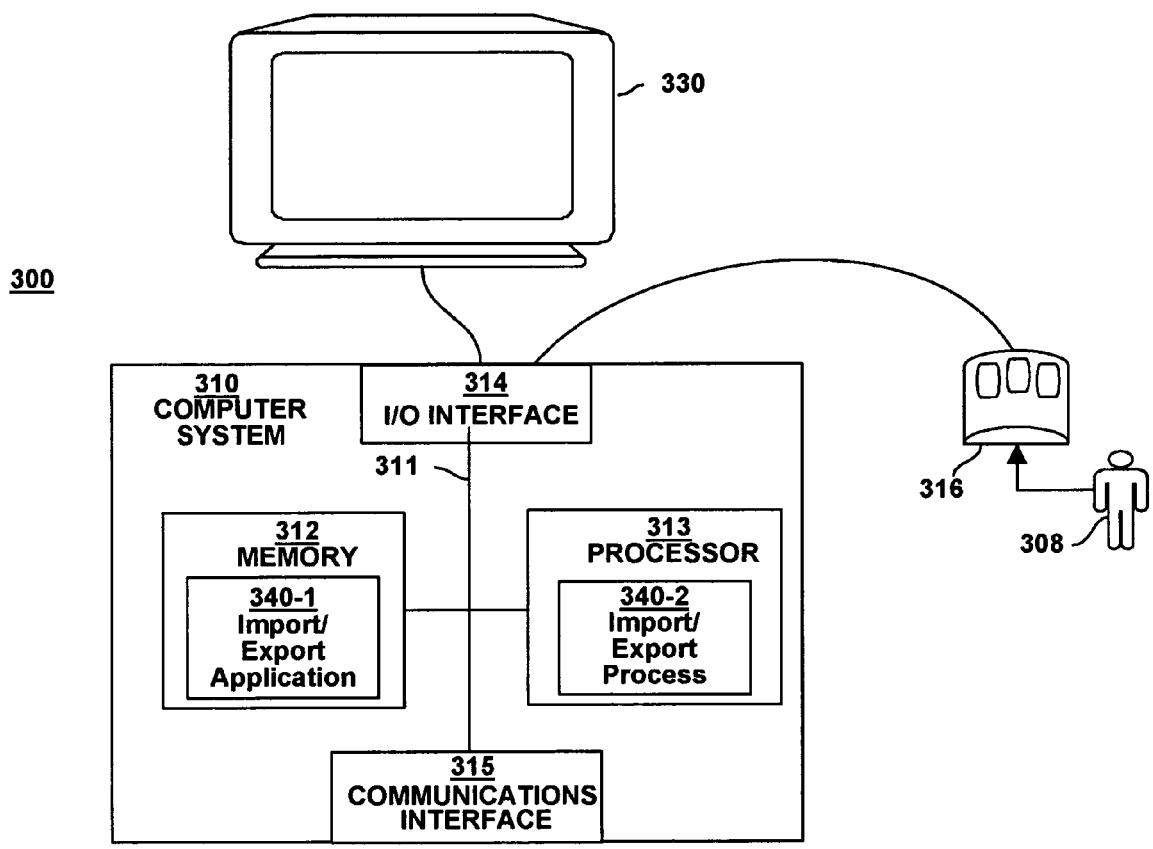
FIG. 7 illustrates an example computer system architecture for a computer system that performs importing, exporting and determining an initial state for files having multiple layers in accordance with embodiments of the disclosure.

Flow charts of the presently disclosed methods are depicted in FIGS. 4, 5 and 6. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present disclosure. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the disclosure. Thus, unless otherwise stated the steps described below are unordered meaning that, when possible, the steps can be performed in any convenient or desirable order.

Referring now to FIG. 4 a particular embodiment of a method 100 is shown. Method 100 begins with processing block 102, which discloses importing a file for editing, the file comprising a plurality of layers, the file being in a first format. As shown in processing block 104, importing includes providing a mapping between supported features of the file being imported and the application used to import the file.

Processing block 106 states receiving a selection of a layer from the plurality of layers. Processing block 108 recites providing a first state for the layer. As shown in processing block 110, the first state of the layer comprises one of a maintain appearance state and an editable state.

Processing block 112 discloses providing a second state for the layer. As shown in processing block 114 the second state of the layer comprises one of a maintain appearance state and an editable state and wherein the second state is different than the first state.

Processing block 116 recites displaying one of the first state of the selected layer and the second state of the selected layer based on a user-specified preference. Processing continues with processing block 118 which recites permitting a swapping between the first state of the layer and the second state of the layer. Each layer is represented by a thumbnail. When the thumbnail is clicked, the state of the layer is changed from one state to the other state.

Processing block 120 recites the maintain appearance state comprises a state wherein an appearance of the layer is maintained and wherein attributes of the layer may not be editable and wherein said editable state comprises a state wherein attributes of the layer are editable and wherein the layer may have a different appearance.

Processing block 122 discloses editing a state of a layer being presented. Processing block 124 states committing one of the first state of the selected layer and the second state of the selected layer. Once the user has selected the desired state for the layer, the user can perform operations on the layer and then commit the layer, or simply commit the layer without performing operations on the layer. Processing block 126 states committing the file comprising a plurality of layers. Once the user has finished editing the file, the user can commit the entire file, which will commit the layers of the file. Additionally, a user can save the two states into the file format in which there will be no automatic committing at all. Hence closing the file and opening it back would get back the two states.

Referring now to FIG. 5, a particular embodiment of a method 150 of performing Smart Export is shown. Method 150 begins with processing block 152, which discloses OPENING a file for editing, the file comprising a plurality of layers, the file being in a first format.

Processing block 154 states receiving a selection of a layer from the plurality of layers. Processing block 156 recites providing a first state for the layer. As shown in processing block 158, the first state of the layer comprises one of a maintain appearance state and an editable state.

Processing block 160 discloses providing a second state for the layer. As shown in processing block 162 the second state of the layer comprises one of a maintain appearance state and an editable state and wherein the second state is different than the first state.

Processing block 164 recites displaying one of the first state of the selected layer and the second state of the selected layer based on a user-specified preference. Processing continues with processing block 166 which recites permitting a swapping between the first state of the layer and the second state of the layer. Each layer is represented by a thumbnail. When the thumbnail is clicked, the state of the layer is changed from one state to the other state.

Processing block 168 recites the maintain appearance state comprises a state wherein an appearance of the layer is maintained and wherein attributes of the layer may not be editable and wherein said editable state comprises a state wherein attributes of the layer are editable and wherein the layer may have a different appearance.

Processing block 170 discloses editing a state of a layer being presented.

Processing block 172 states exporting the file wherein for at least one layer of the file, the first state of the layer and the second state of the layer are stored separately as two different layers having a same layer identifier (id) and wherein one of the states is inactive. As shown in processing block 174 the inactive state of the layer includes a tag denoting a state type. As further shown in processing block 170, the file can be exported in a second format which is different than the first format.

Referring now to FIG. 6, a particular embodiment of a method 200 for determining an initial state for files having multiple layers is shown. Method 200 begins with processing block 202, which discloses acquiring a first state for a layer of an image file and a second state of the layer of the image file. The first state of the layer may comprise one of a maintain appearance state and an editable state and the second state of the layer may comprise one of a maintain appearance state and an editable state and wherein the second state is different than the first state.

Processing block 204 states flattening the first state to produce a flattened first state and processing block 206 recites flattening the second state to produce a flattened second state. Both states of the file are flattened to the same format and now can be directly compared to each other.

Processing block 208 discloses determining a similarity value between the flattened first state and the flattened second state. The two flattened states are compared to each other. The comparison could be made using an exclusive or (XOR) function. A similarity value is calculated after XORing each pixel of both states, for example the similarity value is equal to the summation over all pixels ((grey value at a pixel)/255)/Total number of pixels. A similarity percentage can be determined (e.g., percentage similarity=100*(1−similarity)). As further shown in processing block 210, the similarity value can be displayed with the layer. As shown in processing block 212 the similarity value is computed for each layer of a layer set and an average similarity value is determined for the layer set.

Processing continues with processing block 214 which states comparing the similarity value to a threshold value. As shown in processing block 216 when the similarity value is greater than the threshold value then the first state (the editable state) for the layer is kept. As shown in processing block 218 when the similarity value is not greater than the threshold value then the second state (maintain appearance state) for the layer is kept.

FIG. 6 is a block diagram illustrating an example computer system 300 for implementing import/export function 340 and/or other related processes to carry out the different functionality as described herein.

As shown, computer system 300 of the present example includes an interconnect 311 that couples a memory system 312 and a processor 313 an input/output interface 314, and a communications interface 315.

As shown, memory system 312 is encoded with import/export application 340-1.

Import/export application 340-1 can be embodied as software code such as data and/or logic instructions (e.g., code stored in the memory or on another computer readable medium such as a disk) that support functionality according to different embodiments described herein.

During operation, processor 313 (including one or more of a Central Processing Unit (CPU) and a Graphics Processing Unit (GPU)) of computer system 300 accesses memory system 312 via the interconnect 311 in order to launch, run, execute, interpret or otherwise perform the logic instructions of the import/export application 340-1. Execution of import/export application 340-1 produces processing functionality in import/export process 340-2. In other words, the import/export process 340-2 represents one or more portions of the import/export application 340-1 (or the entire application) performing within or upon the processor 313 in the computer system 300.

It should be noted that, in addition to the import/export process 340-2, embodiments herein include the import/export application 340-1 itself (i.e., the un-executed or non-performing logic instructions and/or data). The import/export application 340-1 can be stored on a computer readable medium such as a floppy disk, hard disk, or optical medium. The import/export application 340-1 can also be stored in a memory type system such as in firmware, read only memory (ROM), or, as in this example, as executable code within the memory system 312 (e.g., within Random Access Memory or RAM).

In addition to these embodiments, it should also be noted that other embodiments herein include the execution of import/export application 340-1 in processor 313 as the import/export process 340-2. Those skilled in the art will understand that the computer system 300 can include other processes and/or software and hardware components, such as an operating system that controls allocation and use of hardware resources associated with the computer system 300.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the disclosure it will now become apparent to those of ordinary skill in the art that other embodiments incorporating these concepts may be used. Additionally, the software may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the disclosure should not be limited to the described embodiments but rather should be limited only by the spirit and scope of the appended claims.

What is claimed is:

1. A computer implemented method comprising:
   receiving, by at least one processor, an image file comprising a plurality of layers, each of the plurality of layers having a maintain appearance state and an editable state, each of the maintain appearance state and the editable state having active and inactive settings, the maintain appearance state setting configured to be different than the editable state setting;
   displaying, by the at least one processor, at least one thumbnail corresponding with at least one of the plurality of layers;
   receiving, by the at least one processor, a selection of a layer from the plurality of layers; and
   in response to receiving the selection of the layer, swapping, by the at least one processor, the maintain appearance state setting and the editable state setting for the selected layer.

2. The method of claim 1 wherein the maintain appearance state comprises a state wherein an appearance of the layer is maintained and wherein attributes of the layer may not be editable and wherein the editable state comprises a different state wherein attributes of the layer are editable and wherein the layer may have a different appearance.

3. The method of claim 1 further comprising committing said image file comprising a the plurality of layers.

4. The method of claim 1 further comprising committing one of the maintain appearance state and the editable state for at least one of the plurality of layers.

5. The method of claim 1 wherein receiving the image file comprises providing a mapping between supported features of the image file and an application used to display the image file.

6. A non-transitory computer readable medium having computer readable code thereon for importing a file comprising multiple layers, the medium comprising:
   instructions for receiving an image file comprising a plurality of layers, each of the plurality of layers configured to have a maintain appearance state and an editable state, each of the maintain appearance state and the editable state configured to have active and inactive settings, the maintain appearance state setting configured to be different than the editable state setting;
   instructions for displaying at least one thumbnail corresponding with at least one of the plurality of layers;
   instructions for receiving a selection of a layer from the plurality of layers;
   instructions for swapping, in response to receiving the selection of the layer, the maintain appearance state setting and the editable state setting for the selected layer.

7. The non-transitory computer readable medium of claim 6 further comprising instructions wherein the maintain appearance state comprises a state wherein an appearance of the layer is maintained and wherein attributes of the layer may not be editable and wherein the editable state comprises a different state wherein attributes of the layer are editable and wherein the layer may have a different appearance.

8. The non-transitory computer readable medium of claim 6 further comprising instructions for committing the image file comprising the plurality of layers.

9. The non-transitory computer readable medium of claim 6 further comprising instructions for committing one of the maintain appearance state and the editable state for at least one of the plurality of layers.

10. The non-transitory computer readable medium of claim 6 wherein instructions for receiving the image file comprises instructions for providing a mapping between supported features of the image file and an application used to import the image file.

11. The method of claim 1 wherein the image file comprises a static image.

12. The method of claim 1 wherein displaying the at least one thumbnail comprises displaying, for each layer, a thumbnail corresponding to that layer.

13. The non-transitory computer readable medium of claim 6 wherein the instructions for displaying the at least one thumbnail comprises instructions for displaying, for each layer, a thumbnail corresponding to that layer.

14. The method of claim 1 wherein at least two of the layers from the plurality of layers are configurable to simultaneously have an active editable state setting.

15. The non-transitory computer readable medium of claim 6 further comprising instructions configured to allow at least two of the layers from the plurality of layers to simultaneously have an active editable state setting.

16. The method of claim 1 wherein the image file comprises a first format and the method further comprises storing the image file in a second format, the second format different than the first format.

17. The non-transitory computer readable medium of claim 6 further comprising instructions for storing the image file in a second format different than a first format of the image file.

18. The method of claim 1 further comprising storing the image file, wherein the storing comprises storing the maintain appearance state and the editable state for at least a one of the plurality of layers.

19. The method of claim 1 wherein at least one of the plurality of layers comprises a layer identifier, the maintain appearance state corresponds with a first layer having the layer identifier, and the editable state corresponds with the layer identifier.

20. The method of claim 1 wherein each of the at least one thumbnail comprises a graphical representation of at least one layer in the plurality of layers.

21. The method of claim 1 further comprising determining a similarity value for at least one layer in the plurality of layers.

22. The method of claim 21 wherein determining the similarity value comprises flattening the maintain appearance state and the editable state for the at least one layer in the plurality of layers.

23. The method of claim 21 wherein determining the similarity value comprises applying an XOR to at least one pixel associated with the maintain appearance state and at least one pixel in the editable state.

24. The method of claim 21 wherein determining the similarity value comprises calculating a similarity value for each layer of a set of layers in the plurality of layers and determining an average similarity value for the set of layers.

25. The method of claim 21 further comprising displaying the similarity value for the at least one layer, wherein displaying the similarity value comprises overlaying the similarity value over at least one thumbnail.

26. The method of claim 21 further comprising displaying the similarity value for the at least one layer, wherein displaying the similarity value comprises coloring a portion of a layer in the plurality of layers or at least one thumbnail with a color based on the similarity value.

* * * * *

UNITED STATES PATENT AND TRADEMARK OFFICE
CERTIFICATE OF CORRECTION

| | | |
|---|---|---|
| PATENT NO. | : 8,170,380 B1 | Page 1 of 1 |
| APPLICATION NO. | : 12/130412 | |
| DATED | : May 1, 2012 | |
| INVENTOR(S) | : Anant Gilra | |

It is certified that error appears in the above-identified patent and that said Letters Patent is hereby corrected as shown below:

Column 11, Claim 3, Line 2:

Delete the word "a"

Signed and Sealed this
Third Day of July, 2012

David J. Kappos
*Director of the United States Patent and Trademark Office*

UNITED STATES PATENT AND TRADEMARK OFFICE
CERTIFICATE OF CORRECTION

PATENT NO.       : 8,170,380 B1
APPLICATION NO.  : 12/130412
DATED            : May 1, 2012
INVENTOR(S)      : Anant Gilra It is certified that error appears in the above-identified patent and that said Letters Patent is hereby corrected as shown below:

Column 11, line 55 (Claim 3, Line 2)

Delete the word "a"

This certificate supersedes the Certificate of Correction issued July 3, 2012.

Signed and Sealed this
Fourteenth Day of August, 2012

David J. Kappos
*Director of the United States Patent and Trademark Office*